United States Patent
Wang et al.

(10) Patent No.: US 10,498,622 B2
(45) Date of Patent: Dec. 3, 2019

(54) TUNNEL STATE DETECTION FOR OVERLAY NETWORKS

(71) Applicant: Nicira, Inc., Palo Alto, CA (US)

(72) Inventors: Yusheng Wang, Beijing (CN); Bolt Zhang, Beijing (CN); Ming Shu, Beijing (CN); Wang Qiong, Beijing (CN)

(73) Assignee: VMware, Inc., Palo Alto, CA (US)

( * ) Notice: Subject to any disclaimer, the term of this patent is extended or adjusted under 35 U.S.C. 154(b) by 147 days.

(21) Appl. No.: 15/699,769

(22) Filed: Sep. 8, 2017

(65) Prior Publication Data
US 2019/0081877 A1    Mar. 14, 2019

(51) Int. Cl.
H04L 12/26 (2006.01)
H04L 12/46 (2006.01)
H04L 29/06 (2006.01)

(52) U.S. Cl.
CPC ...... *H04L 43/0864* (2013.01); *H04L 12/4633* (2013.01); *H04L 43/04* (2013.01); *H04L 43/50* (2013.01); *H04L 63/0272* (2013.01); *H04L 43/0817* (2013.01); *H04L 43/10* (2013.01); *H04L 43/16* (2013.01)

(58) Field of Classification Search
CPC ..... H04L 43/0864; H04L 43/04; H04L 43/50; H04L 12/4633; H04L 63/0272
See application file for complete search history.

(56) References Cited

U.S. PATENT DOCUMENTS

| | | | | |
|---|---|---|---|---|
| 6,321,264 | B1 * | 11/2001 | Fletcher | H04L 43/00 370/252 |
| 8,965,961 | B1 * | 2/2015 | Roskind | H04L 43/08 709/203 |
| 2014/0075243 | A1 * | 3/2014 | Nagaraj | H04L 43/0811 714/32 |
| 2015/0334009 | A1 * | 11/2015 | Clark | H04L 43/045 370/252 |

OTHER PUBLICATIONS

Changhoon Kim et al., "In-band Network Telemetry (INT)", Jun. 2016, 28 pages.

* cited by examiner

*Primary Examiner* — Nam T Tran (57) ABSTRACT

A method inserts a request message in a first encapsulation header that encapsulates a first packet from a data compute node of a first host to form a first encapsulated packet. The first encapsulation header identifies a first address of a first tunnel endpoint in the first host and a second address of a second tunnel endpoint in the second host. The method then sends the first encapsulated packet through a tunnel via the first address of the first tunnel endpoint to the second address of the second tunnel endpoint. If a second encapsulated packet is received at the first tunnel endpoint in the first host from the second tunnel endpoint in the second host and includes a response message, the method records information for the tunnel based on the sending of the request message and the receiving of the response message.

20 Claims, 7 Drawing Sheets

| | 704 | 706 | 708 | 710 | 712 |
|---|---|---|---|---|---|
| | Time period | # of Active Tunnels | # of Good Tunnels | # of Degraded Tunnels | # of Failed Tunnels |
| 714 | 09:12:00 | 3 | 1 | 1 | 1 |
| 716 | 09:12:30 | 2 | 2 | 0 | 0 |

TUNNEL STATE DETECTION FOR OVERLAY NETWORKS

BACKGROUND

Overlay networks are used for communication between data compute nodes that belong to the same logical network. To implement the overlays, tunnels are created to transport packets between hypervisors. A method to detect the health state of the tunnels is typically used to ensure that the overlay network is operating properly. One method creates individual sessions for each hypervisor pair in which communications may happen. Then, heartbeat messages are introduced between all of the pairs to check tunnel health. In a network, there may be a large amount of possible hypervisor pairs and the introduction of the heartbeat messages for all the pairs introduces significant network traffic into the network.

DETAILED DESCRIPTION

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

A system detects tunnel state in overlay networks when network traffic is being sent through a tunnel. Heartbeat messages are inserted in encapsulation headers of packets being sent through the tunnel. The system uses the heartbeat messages to check the tunnel state, such as whether the tunnel health is good, degraded, or failed. Inserting the heartbeat messages in the encapsulation header "piggybacks" the heartbeat messages in packets already being sent through the tunnel. Because the request is sent using encapsulation headers of packets being already sent, the tunnel state check may not introduce extra packets in the tunnel. Additionally, the heartbeat message that is inserted into the encapsulation packet may not be very large, such as the heartbeat message may only introduce around eight bytes extra per hypervisor pair in each encapsulated packet in some embodiments.

In some examples, a first hypervisor may detect a first packet is being sent from a first data compute node in a first host to a second data compute node in a second host. A first virtual switch in the first hypervisor uses a tunnel endpoint to encapsulate the first packet with an encapsulation header to form a first encapsulated packet. A first tunnel state detector can insert a heartbeat request message into the first encapsulation header. The first virtual switch then sends the first encapsulated packet through a tunnel via the first tunnel endpoint to a second tunnel endpoint located at a second host.

At the second host, a second virtual switch in a second hypervisor uses a second tunnel endpoint to decapsulate the packet. A second tunnel state detector detects that a heartbeat request message is included in the first encapsulation header. Upon detection of the heartbeat request message, a second tunnel state detector notes that a heartbeat response message should be sent back to the first hypervisor. In some embodiments, the second tunnel state detector can wait for a packet to be sent from a data compute node on the second host that requires transmission via the second tunnel endpoint to the first tunnel endpoint. If a second packet is received from the data compute node on the second host, the second tunnel state detector inserts a heartbeat response message in a second encapsulation header when the second packet is encapsulated to form a second encapsulated packet. However, it is possible that a data compute node on the second host may not send a packet that requires transmission via the second tunnel endpoint to the first tunnel endpoint during a time period after receiving the heartbeat request message. In this case, after the time period has elapsed, the second tunnel state detector may cause a second packet to be generated that can be encapsulated. Then, the second tunnel state detector can insert the response message in the encapsulation header of the generated packet to form the second encapsulated packet. In either of the above cases, the second virtual switch then sends the second encapsulated packet via the second tunnel endpoint to the first tunnel endpoint.

When the first virtual switch receives the second encapsulated packet with the heartbeat response message, the first tunnel endpoint can decapsulate the second encapsulated packet. The first tunnel state detector can then retrieve the heartbeat response message from the second encapsulated header. Information from the heartbeat request message and the heartbeat response message may then be used to record information for the tunnel state. For example, the system records a roundtrip time for sending the heartbeat request message and receiving the heartbeat response message.

Overview

Figure 1:
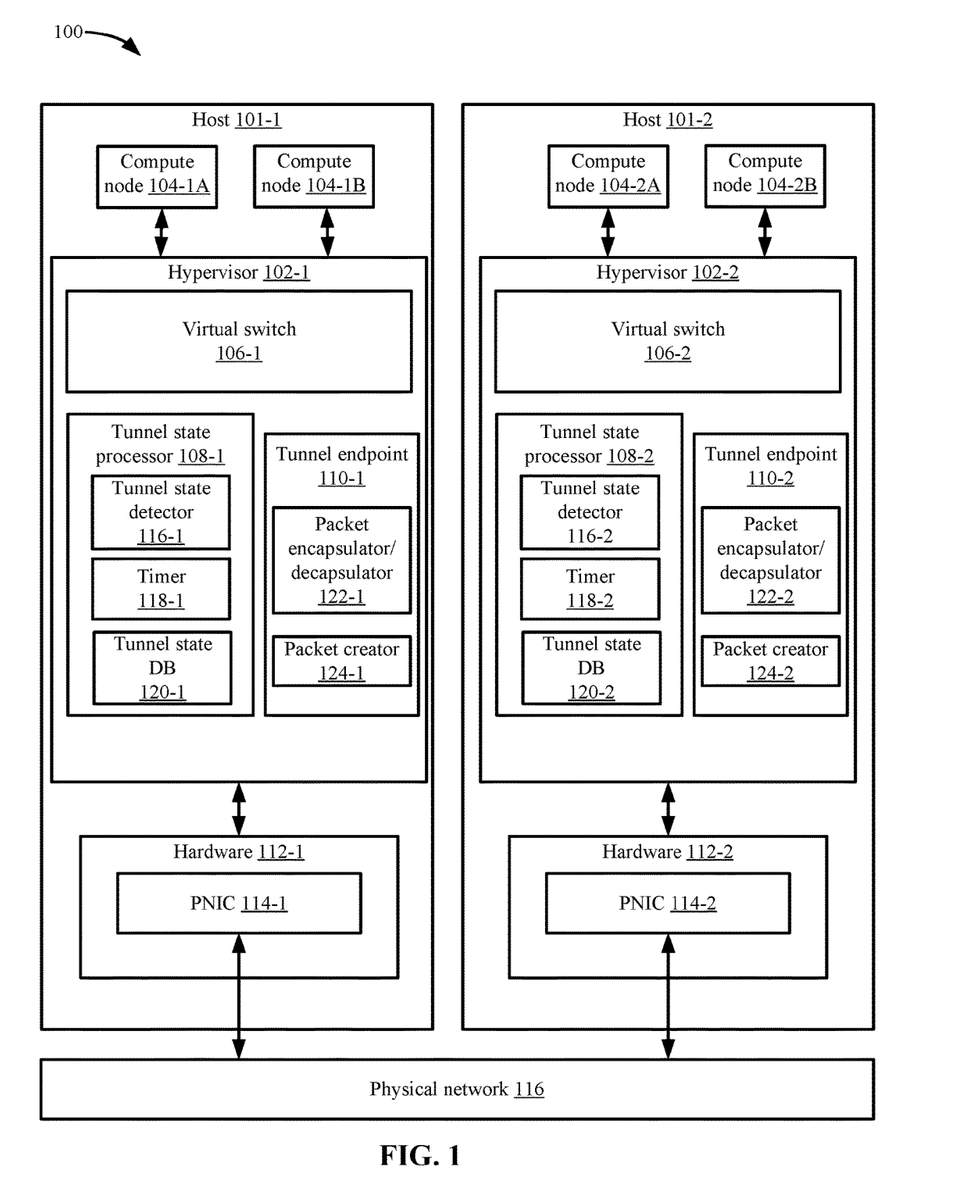
FIG. 1 depicts a computing system that includes a first host and a second host according to some embodiments.

FIG. 1 depicts a computing system 100 that includes a host 101-1 and a host 101-2 according to some embodiments. Host 101-1 and host 101-2 include a tunnel state processor 108-1 and a tunnel state processor 108-2, respectively, that are used to check the tunnel state of a tunnel between tunnel endpoint 110-1 and tunnel endpoint 110-2.

Hosts 101-1 and 101-2 include respective hardware 112-1 and hardware 112-2, and virtualization software (e.g., hypervisor 102-1 and hypervisor 102-2) to support various data compute nodes 104-1A and 104-1B, and 104-2A and 104-2B, respectively. Although two hosts 101-1 and 101-2 are shown, any number of hosts (also known as computing devices, host computers, host devices, host systems, physical servers, service systems, etc.) where each host may support any number of date compute nodes may be used in system 100. Normally, hypervisors 102-1 and 102-2 are capable of network virtualization, but the process of checking the tunnel state as described can be used with any system that uses an overlay network.

Compute nodes 104 may refer to virtual machines that are running on a respective host, but this is one example of a virtualized computing instance or workload. Any suitable technology may be used to provide a compute node. Compute nodes may include not only virtual machines, but also containers (e.g., running on top of a host operating system without the need for a hypervisor or separate operating system or implemented as an operating system level virtualization), virtual private servers, client computers, etc. The compute nodes may also be complete computation environments containing virtual equivalents of the hardware and software components of a physical computing system. Also, as used herein, the term hypervisor may refer generally to a software layer or component that supports the execution of multiple compute nodes including system-level software that supports name space containers.

Compute nodes 104-1A/104-1B to 104-2A/104-2B belong to a logical network implemented in system 100. Hypervisors 102-1 and 102-2 include a virtual switch 106-1 and a virtual switch 106-2, respectively, to handle traffic forwarding (e.g., packets) between compute nodes of host 101-1 and compute nodes of host 101-2. Virtual switches 106-1 and 106-2 use overlay networks for communications between virtual switches. A tunnel (e.g., overlay network) is formed between tunnel endpoints 110-1 and 110-2 in which the packets are sent. A tunnel may generally refer to an end-to-end, bi-directional path between a pair of tunnel endpoints 110. The overlay network uses addresses of tunnel endpoints 110-1 and 110-2 to send encapsulated packets across intervening physical network 116. Tunnel endpoints 110-1 and 110-2 encapsulate packets with an encapsulation header and decapsulate the packets to remove the encapsulation header. The encapsulation header identifies the addresses of tunnel endpoints 110-1 and 110-2, which they hypervisor uses to send the encapsulated packet through the tunnel. A hypervisor may usually create many tunnels, but for discussion purposes, a tunnel between hypervisor 102-1 and hypervisor 102-2 will be discussed.

Tunnel endpoints 110-1 and 110-2 may be part of virtual switch 106-1 and virtual switch 106-2, respectively. However, tunnel endpoints 110-1 and 110-2 may also be separate software entities, but can be thought of as an extension of the virtual switch (e.g., part of input/output (I/O) chain between the virtual switch and a physical network interface (PNIC) through which the host connects to physical network 116. Also, tunnel endpoints 110-1 and 110-2 correspond to PNICs 114-1 and 114-2, respectively. PNICs 114 are physical interfaces of hosts 101-1 and 101-2, respectively. Packets from compute nodes 104-1A and 104-1B are output through PNIC 114-1 onto physical network 116 and packets sent from compute nodes 104-2A and 104-2B are sent through PNIC 114-2 onto physical network 116. Physical network 116 may include any suitable number of interconnected network devices, such as layer 3 routers, layer 2 switches, gateway devices, etc. The term "layer 2" may refer generally to a media access control (MAC) layer and "layer 3" may refer to a network or internet protocol (IP) layer in the open system interconnection (OSI) model, although the concepts described herein may use other networking models.

Some embodiments use packets actively being sent through the tunnel to carry heartbeat messages that can be used to check the tunnel state. For example, compute nodes 104 may send packets that will be encapsulated and sent through the tunnel. As will be described in more detail below, tunnel state processors 108-1 and 108-2 may insert heartbeat messages into the encapsulation header for the packets. Using only active packets being sent, tunnel state processors 108-1 and 108-2 thus check tunnel state on active tunnels. For example, only tunnels in which at least a packet is sent between compute nodes 104-1 and compute nodes 104-2 have their tunnel state checked. However, if a tunnel is not active after a certain period of time, system 100 may perform a liveness check. For example, hosts 101-1 and 101-2 may create empty probe packets that are sent in the tunnel to check the liveness of the tunnel. The probe packets may require a response packets that confirms the liveness of the tunnel.

Hypervisor 102-1 and hypervisor 102-2 both include respective tunnel state processors 108-1 and 108-2, and tunnel endpoints 110-1 and 110-2. Both tunnel state processors 108-1 and 108-2 include tunnel state detectors 116-1/116-2, timers 118-1/118-2, and tunnel state databases (DB) 120-1/120-2. Also, both tunnel endpoints 110-1 and 110-2 include packet encapsulator/decapsulators 112-1/112-2 and packet creators 124-1/124-2. The same entities may be included in tunnel state processors 108-1 and 108-2, and tunnel endpoints 110-1 and 110-2 because at the same time, hypervisors 102-1 and 102-2 may be sending request messages to various hypervisors and receiving response messages from various hypervisors. However, for discussion purposes, an example flow will be described where hypervisor 102-1 initiates the heartbeat request process, hypervisor 102-2 may receive the heartbeat request message, hypervisor 102-2 sends a heartbeat response message, and then, hypervisor 102-1 receives and processes the response message. Thus, in the discussion, it will be understood that functions described as being performed by one hypervisor may be performed by the other hypervisors. The components in FIG. 1 will now be described in more detail with respect to the methods flowcharts of FIGS. 2-4.

Egress Direction

Figure 2:
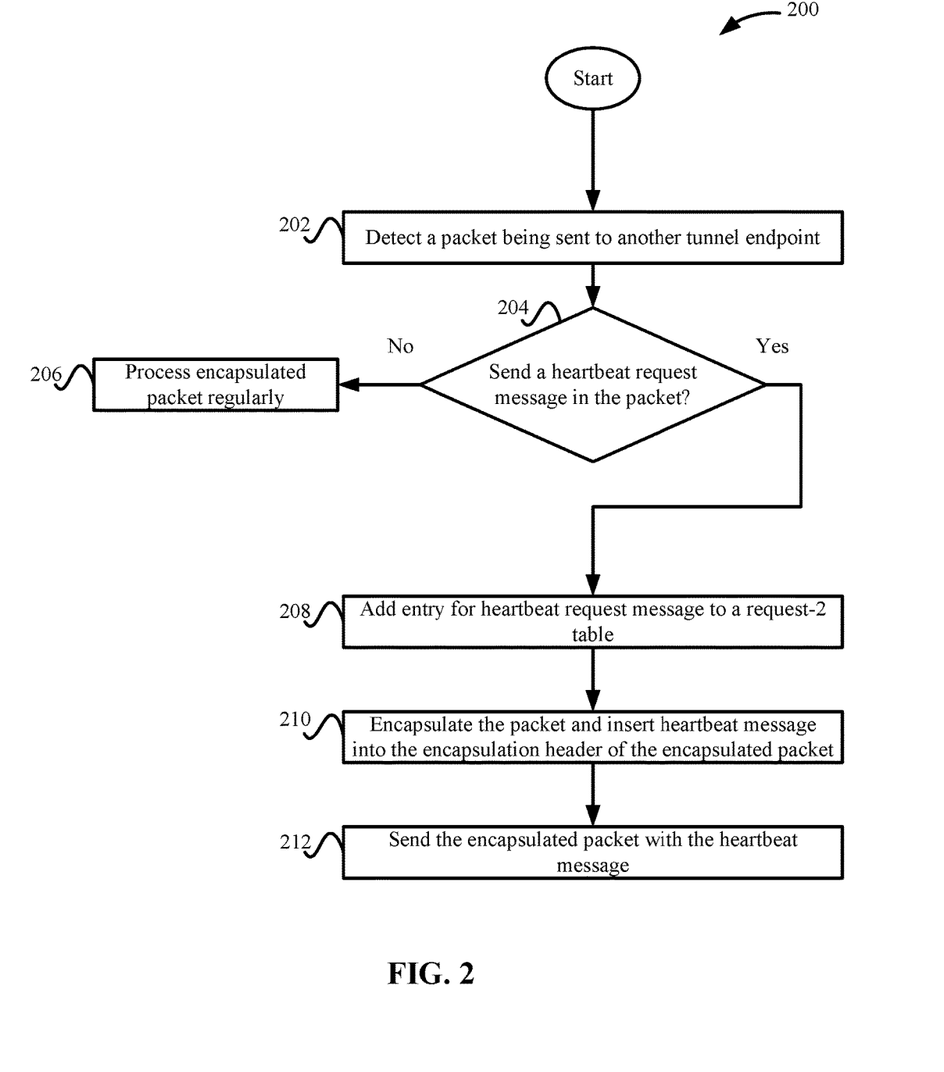
FIG. 2 depicts a simplified flowchart of a method for processing an egress encapsulated packet that includes a heartbeat request message according to some embodiments.

FIG. 2 depicts a simplified flowchart 200 of a method for processing an egress encapsulated packet that includes a heartbeat request message according to some embodiments. The egress direction is when a virtual switch 106 is sending a packet (e.g., a packet from a compute node 104) to another host 101. In this example, a packet is being sent from data compute node 104-1A in host 101-1 to a data compute node 104-2A in host 101-2. At 202, hypervisor 102-1 detects when a packet is being sent to another tunnel endpoint. For example, compute node 104-1A may send a packet to virtual switch 106-1 that is addressed to compute node 104-2A. Virtual switch 106-1 then sends the packet to tunnel endpoint 110-1 for encapsulation.

At 204, the process determines whether to send a heartbeat request message in the packet. Different ways of determining whether to send the heartbeat request message may be used. For example, hypervisor 102-1, virtual switch 106-1, or tunnel endpoint 110-1 may determine whether or not a heartbeat request message should be included in the packet. Then, in some embodiments, tunnel endpoint 110-1 (or hypervisor 102-1 or virtual switch 106-1) may call tunnel state processor 108-1 to have the heartbeat request message inserted into the encapsulation header. In other embodiments, tunnel state processor 108-1 may monitor all packets being encapsulated and determine whether or not a heartbeat request message should be inserted into the encapsulation header.

In some embodiments, only a single heartbeat message may be included in a packet being sent in a specific tunnel in a set time period, such as every 30 seconds. Accordingly, if multiple packets are being sent on the tunnel during the period, only one of the packets may include a heartbeat request message, such as the first packet that is sent during the time period. Subsequent packets being sent in the tunnel during the time period may not include another heartbeat request message. However, in other embodiments, a heartbeat request message may be sent in more than one packet being sent through the tunnel in the time period, such as every packet, every X packets, etc. Tunnel state processor 108-1 may monitor the time period and determine when to insert the heartbeat request message in an outgoing packet.

If the heartbeat request message is not to be included in the packet, then at 206, tunnel endpoint 110-1 and virtual switch 106-1 process the packet regularly. For example, tunnel endpoint 110-1 encapsulates the packet, and virtual switch 106-1 sends the encapsulated packet to tunnel endpoint 110-2 through the tunnel without any heartbeat request message.

If a heartbeat request message is to be included in the packet, at 208, tunnel state detector 116-1 in tunnel state processor 108-1 adds an entry for a heartbeat request message to a request table. The request table may keep track of the heartbeat request messages that are being sent. Tunnel endpoint 110-1 uses the request table to determine the tunnel state when (or if) a heartbeat response message is received. In the request table, tunnel state detector 116-1 may add an entry that includes information that can be used to identify the tunnel and also calculate the tunnel state, such as a source tunnel address (e.g., IP address) for tunnel endpoint 110-1 and a destination tunnel address for tunnel endpoint 110-2, a new message ID for the heartbeat request message, a current time, and a roundtrip time. The current time may be the time in which the heartbeat request message is being sent. The roundtrip time may initially include a default value, such as "MAX", another default value, or no value. Because the response message has not been received yet, the roundtrip time has not been calculated and the default value of MAX may be used. Tunnel state processor 108-1 may replace the default value if a heartbeat response message is received.

At 210, packet encapsulator/decapsulator 122-1 in tunnel endpoint 110-1 encapsulates the packet with an encapsulation header that includes the heartbeat request message and tunnel state detector 116-1 inserts the heartbeat request message into the encapsulation header. In some embodiments, tunnel state detector 116-1 may return the information for the heartbeat request message to packet encapsulator/decapsulator 122-1, which then generates the encapsulation header with the heartbeat request message inserted in the header. In other embodiments, packet encapsulator/decapsulator 122-1 may call tunnel state detector 116-1 to have the heartbeat request message inserted in the encapsulation header. In some embodiments, the heartbeat request message includes information that allows the round-trip time to be calculated, such as the message ID and also an indication that this encapsulated packet includes a heartbeat request message. An example of a heartbeat request message format will be described in more detail in FIG. 8.

At 212, virtual switch 106-1 sends the encapsulated packet with the heartbeat request message via tunnel endpoint 110-1. As discussed above, the encapsulated packet may be sent via PNIC 114-1, physical network 116 to PNIC 114-2 and virtual switch 106-2.

Ingress Direction

Figure 3:
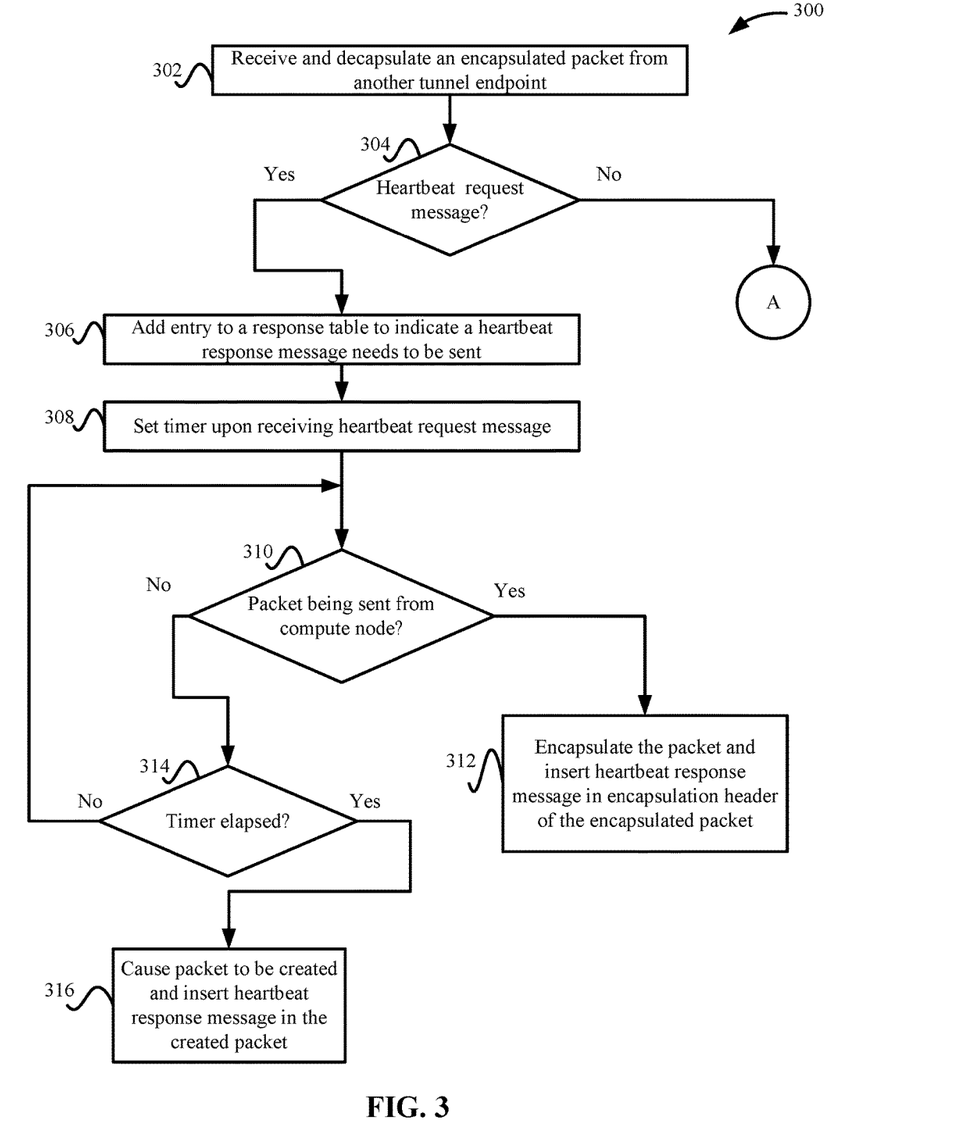
FIG. 3 depicts a simplified flowchart of a method for processing an ingress encapsulated packet that includes the heartbeat request message according to some embodiments.

The following describes the ingress direction when an encapsulated packet arrives at a hypervisor 102 through a tunnel. When an encapsulated packet arrives through a tunnel, it is possible that the packet may include a heartbeat request message, a heartbeat response message, or no heartbeat message. FIG. 3 will describe an example when the encapsulated packet includes the heartbeat request message, which host 101-2 receives from host 101-1, and FIG. 4 will describe an example when the encapsulated packet includes the heartbeat response message that host 101-1 receives from host 101-2. However, as mentioned above, a single host may be receiving both heartbeat request messages and heartbeat response messages.

FIG. 3 depicts a simplified flowchart 300 of a method for processing an ingress encapsulated packet that includes the heartbeat request message according to some embodiments. At 302, virtual switch 106-2 receives an encapsulated packet from tunnel endpoint 110-1. In this case, the encapsulated packet is addressed to tunnel endpoint 110-2. Tunnel endpoint 110-2 uses packet encapsulator/de-capsulator 122-2 to decapsulate the packet, which removes the encapsulation header. Then, at 304, either tunnel endpoint 110-2 or tunnel state processor 108-2 can review information from the encapsulation header to determine whether or not the encapsulation header includes a heartbeat request message. For example, the encapsulation header may have information that is set to indicate whether the heartbeat request message is included, such as a bit may be set to "0" when the heartbeat request message is included, set to "1" when the heartbeat response message is included, and have no value when no heartbeat message is included. If the encapsulation header does not include a heartbeat request message, then the processing continues at A, which will be discussed in FIG. 4 below.

If the encapsulation header includes a heartbeat request message, then at 306, tunnel state detector 116-2 adds an entry to a response table in tunnel state database 120-2 to indicate that a heartbeat response message needs to be sent. Tunnel state detector 116-2 uses the entry in the response table to keep track of which heartbeat response messages need to be sent because some embodiments may wait for active traffic on the tunnel to insert a heartbeat response message into a packet. For example, a compute node 104-2 may send a packet via tunnel endpoint 110-2 that is destined for tunnel endpoint 110-1. At that point, the heartbeat response message may be inserted into the encapsulated header. However, if a packet is not sent from tunnel endpoint 110-2 to tunnel endpoint 110-1 during a time period, then tunnel state processor 108-2 may cause a packet to be created that can be sent with the heartbeat response message. Waiting for a packet to be sent via the tunnel attempts to not increase the number of packets being sent on the tunnel. However, tunnel state detector 116-2 wants to ensure that a heartbeat request/heartbeat response cycle is completed in a certain amount of time, which is why tunnel state detector 116-2 uses the timer to determine when to create a packet.

The entry in the response table may include information to identify a heartbeat request message, such as the message ID from the heartbeat request message, the current time, the source tunnel address, and the destination tunnel address. Because the heartbeat response message will be sent in the reverse direction, the source tunnel address may be for tunnel endpoint 110-2 and the destination tunnel address is tunnel endpoint 110-1. Additionally, at 308, tunnel state detector 116-2 may start timer 118-2 to keep track of a period in which tunnel state detector 116-2 looks for a packet being sent from a compute node 104-2 via tunnel endpoint 110-2 to tunnel endpoint 110-1. The entry and timer may be used to keep track of which response messages need to be sent, but other methods may be used.

At 310, hypervisor 102-2 detects whether a packet is being sent from compute node 104-2 via tunnel endpoint 110-2 for tunnel endpoint 110-1. For example, tunnel endpoint 110-2 or tunnel state processor 108-2 may monitor packets being sent by virtual switch 106-2. If a packet is sent from compute node 104-2, at 312, packet encapsulator/decapsulator 122-2 encapsulates the packet and tunnel state detector 116-2 inserts the heartbeat response message in the encapsulation header. For example, packet encapsulator/decapsulator 122-2 may review the response table to determine that an entry exists for the source tunnel endpoint address and destination tunnel endpoint address for the packet being sent. Then, packet encapsulator/decapsulator 122-2 may call tunnel state detector 116-2 to insert the heartbeat response message into the encapsulation header. In another embodiment, tunnel state detector 116-2 may return the heartbeat response message to packet encapsulator/decapsulator 122-2, which then generates the encapsulation header with the heartbeat response message inserted in the header. Alternatively, tunnel state detector 116-2 monitors all packets to determine whether or not to include the heartbeat response message in one of the packets.

The heartbeat response message may include the message ID that was included in the corresponding heartbeat request message, an indication that this encapsulated packet includes a heartbeat request message, and a wait time. The wait time may be how long the response message was held upon receiving the request message before it was transmitted. The wait time is needed because the response message may not be sent immediately upon receiving the request message because tunnel state detector 116-2 waits to see if a packet will be sent through the tunnel. Because of this delay, a roundtrip time may not be an accurate time to represent the time it takes to send and receive heartbeat messages through the tunnel without taking into account the wait time. Tunnel state detector 116-2 may determine the wait time based on a value of timer 118-2 or by using the current time minus the receipt time that was stored in the response table for when the response message was received.

If there is not a packet being sent from the compute node, at 314, tunnel state detector 116-2 determines if timer 118-2 has elapsed. For example, a default wait time may be five seconds, but other values may be used. If not, the process reiterates to 310 to continue to monitor for a packet being sent from compute node 104-2. However, if the timer has elapsed, at 316, tunnel state detector 116-2 causes a packet to be created, such as an empty packet. Then, tunnel state detector 116-2 inserts a heartbeat response message in an encapsulation header for the created packet. In either of the above examples, virtual switch 106-2 sends the encapsulated packet via tunnel endpoint 110-2 to tunnel endpoint 110-1.

Figure 4:
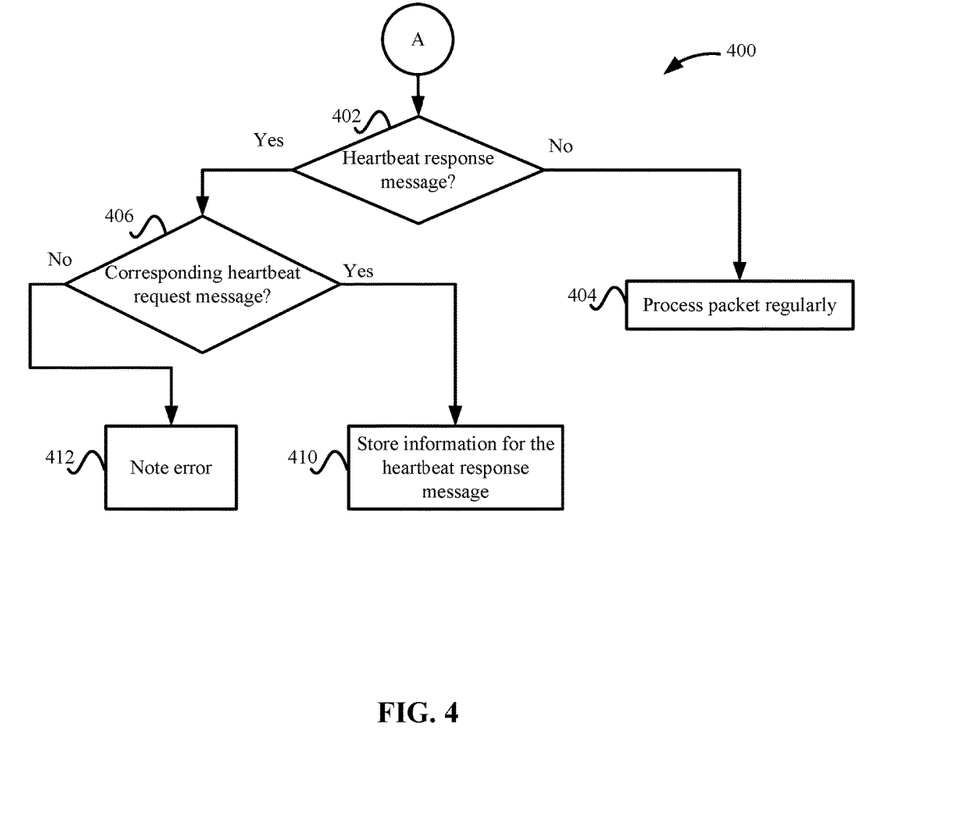
FIG. 4 depicts a simplified flowchart of a method for further processing of an ingress encapsulated packet that includes a heartbeat response message according to some embodiments.

FIG. 4 depicts a simplified flowchart 400 of a method for further processing of an ingress encapsulated packet that includes a heartbeat response message according to some embodiments. When the packet is received at host 101-1, steps 302 and 304 may be performed by hypervisor 102-1. For example, virtual switch 106-1 receives encapsulated packet and tunnel endpoint 110-1 uses packet encapsulator/de-capsulator 122-1 to decapsulate the encapsulation header from the packet (step 302). Then, at 304, either tunnel endpoint 110-1 or tunnel state processor 108-1 can review the information from the encapsulation header to determine whether or not a heartbeat request message is included in the encapsulation header. In this example, the process proceeds to step A in FIG. 4 because the heartbeat request message is not included.

At 402, tunnel endpoint 110-1 or tunnel state processor 108-1 analyzes the encapsulation header to determine whether or not a heartbeat response message is included in the encapsulation header. If not, at 404, virtual switch 106-1 may process the packet regularly. For example, virtual switch 106-1 may decapsulate the packet to remove the encapsulation header and forward the packet to compute node 104-1A or 104-1B.

If a heartbeat response message is included in the encapsulation header, at 406, tunnel state detector 116-1 determines whether or not there is a corresponding heartbeat request message that was sent for the heartbeat response message. For example, as was discussed above in FIG. 2, tunnel state detector 116-1 added an entry for the heartbeat request message to a request table. If the request table includes an entry that includes the message ID found in the heartbeat response message, then this response message corresponds to the heartbeat request message. Then, at 410, tunnel state detector 116-1 may store information for the heartbeat response message. For example, in the roundtrip time column of the entry, tunnel state detector 116-1 may store the roundtrip time. The roundtrip time may be calculated by using the receipt time of the heartbeat response message (receipt$_{time}$), the send time of the heartbeat request message (send$_{time}$), and the wait time. For example, the equation (receipt$_{time}$−send$_{time}$−wait time) may be used, but other methods of calculating the tunnel state may be used. Although the roundtrip calculation is described, it will be understood that other metrics for tunnel state may be used, such as tunnel state detector 116-1 stores an indication that a heartbeat response message is received. Also, tunnel state detector 116-1 (or host 101-1) does not need to calculate the tunnel state; rather, a separate computing device may calculate the tunnel state. For example, tunnel state detector 116-1 stores the receipt time of the response message and another computing device calculates the roundtrip time in some embodiments.

At 412, if tunnel state detector 116-1 determines there is not a corresponding heartbeat request message that was sent for the heartbeat response message, then tunnel state detector 116-1 records an error. For example, an error may result because it took too long for the heartbeat response message to be received.

Data Structures

Some embodiments may use various data structures to record information for the tunnel state. FIGS. 5A-5E describe data structures that can be generated for a first time period according to some embodiments. In one example, the tables in FIGS. 5A-5E may be for a first 30 second time period of 9:12:00-9:12:30. Although this time period is selected, it will be understood that other lengths of time may be used. In the time period, a maximum of one heartbeat request message may be sent out for a pair of tunnel endpoints. However, more than one heartbeat request message may be sent during the time period in other embodiments.

Figure 5A:
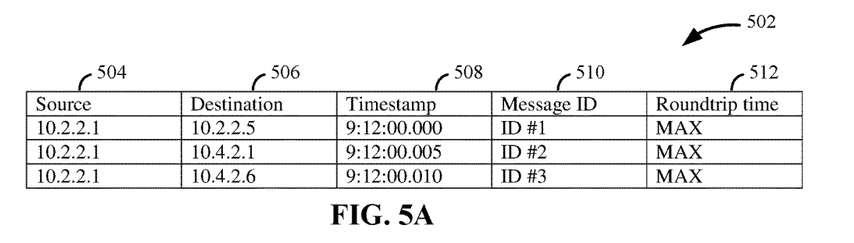
FIG. 5A depicts a table that describes heartbeat request messages that have been sent by a first hypervisor according to some embodiments.

FIG. 5A depicts a table 502 that describes heartbeat request messages that have been sent by hypervisor 102-1 according to some embodiments. Table 502 includes a source column 504, a destination column 506, a timestamp column 508, a message ID column 510 and a roundtrip time 512. Source column 502 lists the source tunnel address and destination column 506 may list the destination tunnel endpoint address. Timestamp column 508 lists the time that can be used to calculate the roundtrip time, such as when the heartbeat request message was sent. The message ID column is the message ID that was created for the heartbeat request message and can be used to uniquely identify a heartbeat response message that is associated with the heartbeat request message. Roundtrip time column 512 lists the roundtrip time for sending the heartbeat request message and receiving the heartbeat response message. Tunnel state detector 116-1 inserts he value of "MAX" at first to indicate that the heartbeat response message has not been received during the period.

Each row in table 502 may be associated with a different heartbeat request message. As shown, different source, destination, timestamps, and message IDs are provided, such as a source 10.2.2.1 has active tunnels with addresses of 10.2.2.5, 10.4.2.1, and 10.4.2.6. Hypervisor 102-1 may also have other tunnels created, but active traffic has not been sent on those tunnels during this time period. In one example, "10.2.2.1" may be the address for tunnel endpoint 110-1 and "10.2.2.5" may be the address for tunnel endpoint 110-2.

Figure 5B:
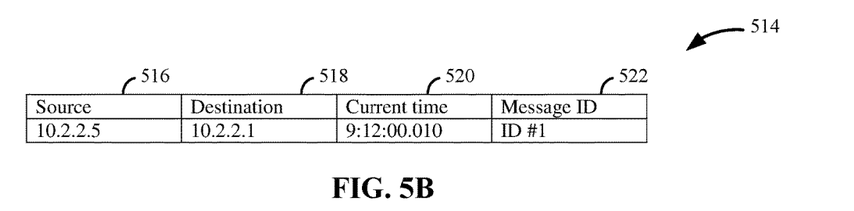
FIG. 5B depicts a response table for a second hypervisor according to some embodiments.

Different tunnel endpoints receive the heartbeat request messages, which may be implemented at the same hypervisor or at different hypervisors. In one example, the system checks tunnel state for all tunnels or in other embodiments, the system checks tunnel state from a single tunnel between all possible hypervisor pairs. That is, if a first hypervisor has two tunnels between a second hypervisor, one or both of the tunnels may be checked. In this example, it is assumed that the heartbeat request messages are sent to different hypervisors. FIG. 5B depicts a response table for a second hypervisor 102-2 according to some embodiments. Table 514 includes a source column 516, a destination column 518, a current time column 520, and a message ID column 522. Source column 516 and destination column 518 list the source tunnel endpoint address and the destination tunnel endpoint address that are reversed from the heartbeat request message. For example, the source tunnel endpoint address of "10.2.2.5" in table 514 is the destination tunnel endpoint address in table 502 and the destination tunnel endpoint address of "10.2.2.1" in table 514 is the source tunnel endpoint address in Table 502. The source and destination addresses are reversed because the heartbeat response message will be sent from the tunnel endpoint that received the heartbeat request message back to the tunnel endpoint that sent the heartbeat request message. Current time column 520 lists the time in which the heartbeat request message was received. Then, message ID column 522 lists the message ID of the heartbeat request message.

Figure 5C:
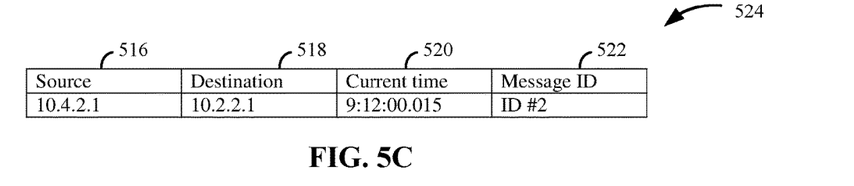
FIG. 5C depicts another response table for a third hypervisor according to some embodiments.

FIG. 5C depicts another response table 524 for a third hypervisor 102 according to some embodiments. For example, table 524 may be associated with a third hypervisor 102 and includes similar columns as table 514. The entry in table 524 is for a response message ID #2 sent from a source address of "10.4.2.1" to destination address "10.2.2.1". Also, the current time in the entry is when the third hypervisor received the heartbeat request message with message ID #2.

Figure 5D:
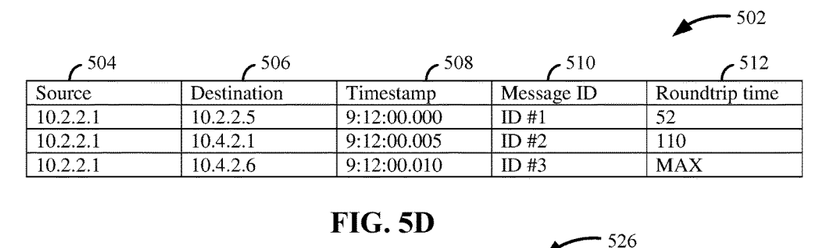
FIG. 5D depicts an updated example of request table according to some embodiments.

The second and third hypervisors 102 send the heartbeat response messages corresponding to message ID #1 and message ID #2, respectively, to the originating hypervisor 102 via the respective tunnels. FIG. 5D depicts an updated example of request table 502 according to some embodiments. First hypervisor 102-1 has received the heartbeat response messages for message ID #1 and message ID #2 and can then calculate the roundtrip times and insert the times into respective entries in column 512. For message ID #1, the roundtrip time is 52 milliseconds (ms) and for message ID #2, the roundtrip time is 110 ms. It should be noted that first hypervisor 102-1 did not receive a heartbeat response message for message ID #3 in this example. For that tunnel, there may be a tunnel health problem, such as a packet including the heartbeat request message or a heartbeat response message may have been lost.

Figure 5E:
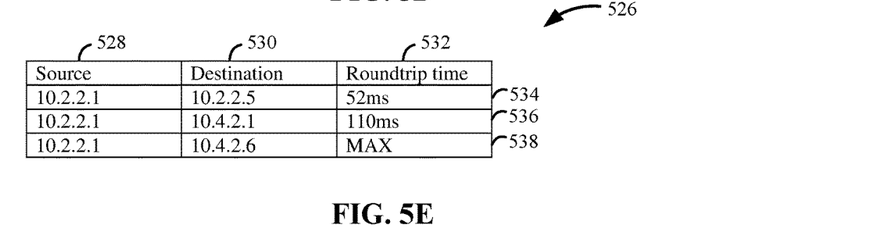
FIG. 5E depicts a state table that summarizes the results for the tunnel state according to some embodiments.

FIG. 5E depicts a state table 526 that summarizes the results for the tunnel state according to some embodiments. State table 526 includes a source column 528, a destination column 530, and a roundtrip time 532 that summarizes information from request table 502. It is noted that a separate state table does not need to be used to summarize the state. However, state table 526 summarizes the information that is needed to check tunnel state and periodically information from request table 502 can be moved to state table 526, such as every time period. As shown at 534, the roundtrip time is 52 ms for message ID #1 and at 536, the roundtrip time is 110 ms for message ID #2. At 538, the value of MAX is included for message ID #3 since a heartbeat response message was not received for a corresponding heartbeat request message. When state table 526 is generated for a time period, tunnel state detector 116-1 may remove information from table 502 that is not needed for analyzing the tunnel state anymore. Also, it will be recognized that other implementations of the database tables may be used. For example, a separate table for the roundtrip time may be used to avoid locking the request table. Also, a second request table may be used when a roundtrip time is calculated, which leaves only pending heartbeat requests in the first request table. Further, although a host 101 is described as performing the tunnel state calculations, it is noted that a separate computing device other than one of the hosts may calculate the roundtrip times.

Figure 6A:
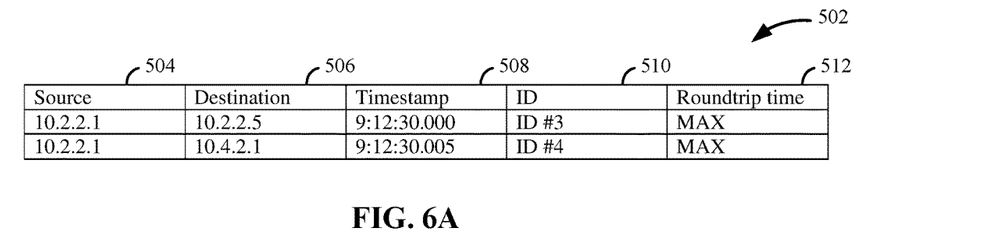
FIG. 6A depicts another table that describes heartbeat request messages that have been sent by a first hypervisor in another time period according to some embodiments.

FIGS. 6A through 6E depict another time period from 9:12:30-9:13:00 according to some embodiments. As shown in FIG. 6A, a first hypervisor 102-2 has sent heartbeat request messages with message ID #3 and message ID #4. During this 30-second period, the tunnel between tunnel endpoints 10.2.2.1 and 10.4.2.6 did not have any active traffic.

Figure 6B:
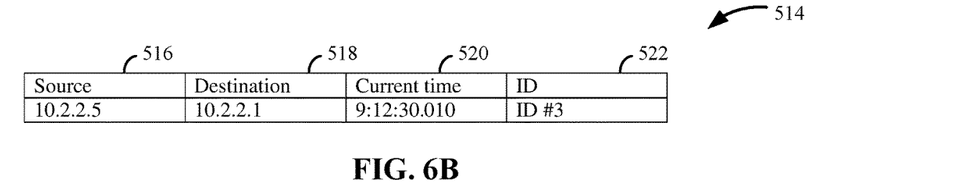
FIG. 6B depicts a response table for a second hypervisor in another time period according to some embodiments.
Figure 6C:
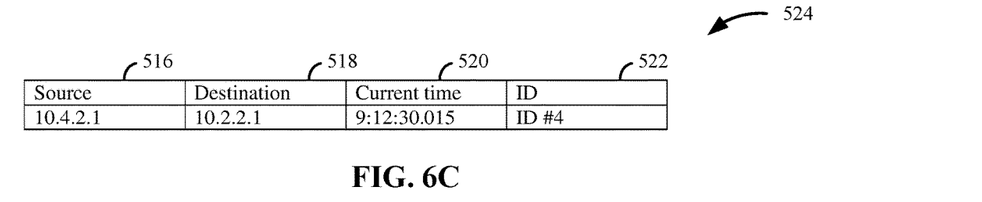
FIG. 6C depicts another response table for a third hypervisor in another time period according to some embodiments.
Figure 6D:
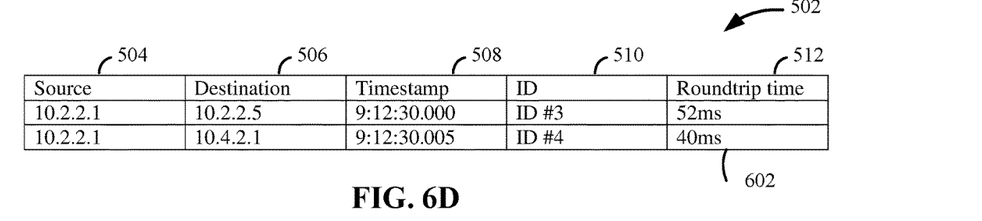
FIG. 6D depicts an updated example of request table in another time period according to some embodiments.
Figure 6E:
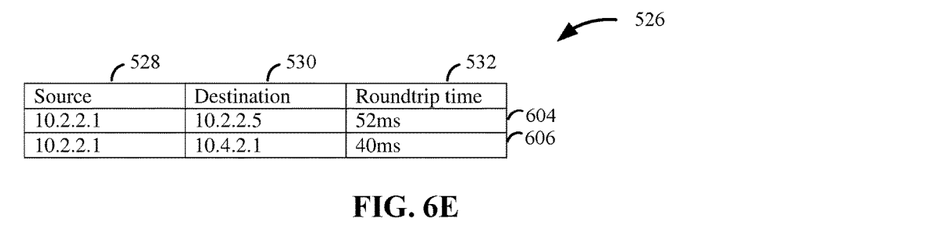
FIG. 6E depicts a state table that summarizes the results for the tunnel state in another time period according to some embodiments.

In FIG. 6B, a second hypervisor 102-2 receives the heartbeat request message and inserts an entry for message ID #3 in response table 514 with a current time. In FIG. 6C, a third hypervisor 102 receives the request message for request ID #4 and inserts a corresponding entry into table 524 with a current time. In FIG. 6D, the first hypervisor 102-1 inserts a roundtrip time for message ID #3 and message ID #4, respectively, in table 502. The roundtrip time for message ID #4 for the tunnel between addresses 10.2.2.1 and 10.4.2.1 has improved from 110 ms to 40 ms as shown at 602. In FIG. 6E, the roundtrip times for the tunnels are reflected at 604 and 606, respectively.

Figure 7:
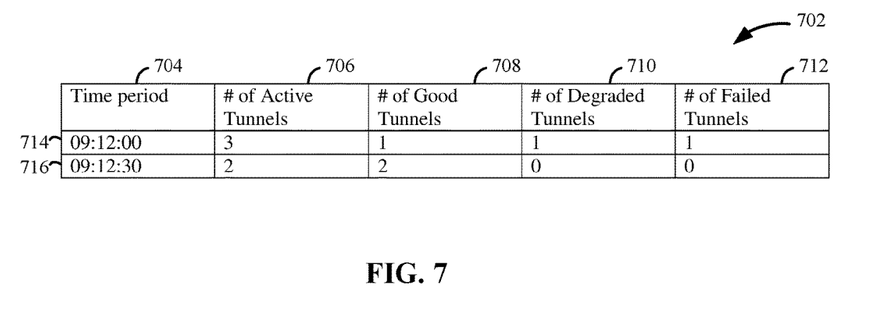
FIG. 7 depicts a statistics table according to some embodiments.

At certain periods, the state table for multiple periods may be aggregated into a statistics table. The aggregation may be performed by a separate computing device or one of the hosts. FIG. 7 depicts a statistics table 702 according to some embodiments. Table 702 includes a time period column 704, a number of active tunnels column 706, a number of good tunnels column 708, a number of degraded columns 710, and a number of failed tunnels column 712. The different time periods described in FIGS. 6A and 6B are shown at 714 and 716, respectively.

In some embodiments, tunnel state detector 116-1 may use different thresholds to evaluate tunnel state. For example, tunnel state detector 116-1 uses a failure threshold to determine if a lost heartbeat message occurs, such as a threshold of one second. For example, if the roundtrip time is higher than one second, then tunnel state detector 116-1 considers the tunnel state as failed. Thus, a tunnel state may be considered failed when a heartbeat response message has not been received or failed when the heartbeat response message takes too long to be received. Also, tunnel state detector 116-1 uses a degraded threshold to determine when performance is considered degraded. For example, a degraded threshold of 100 ms may be used so tunnels with roundtrip times above 100 ms and below one second are considered degraded.

For the entry at 714 during the first period from 9:12:00 to 09:12:30, the number of active tunnels in column 706 is three. This was because three request messages were sent through the tunnels that included heartbeat messages. The number of good tunnels during the first period was one. Even though a response message was received for two active tunnels, the performance was degraded for message ID #2 due to the roundtrip time being 110 ms, which was above the threshold of 100 ms but below one second. Thus, in column 710, the number of degraded tunnels in the first period was one. In column 712, the number of failed tunnels is one because a response message was not received for message ID #3.

During the period from 09:12:30 to 09:13:00, for the entry at 716, in column 706, the number of active tunnels is two, and in column 708, the number of good tunnels is two. This is because response messages were received for the two request messages and also the roundtrip time was within the threshold for good performance. Also, in columns 710 and 712, the number of degraded tunnels is zero and the number of failed tunnels is zero, respectively.

Although the above table is shown, the above information may be aggregated in many different ways. For example, a graph of statistics table 702 may be generated to show the difference between the number of active tunnels and the number of good tunnels and/or degraded tunnels and/or failed tunnels.

Encapsulation Header Format

Figure 8:
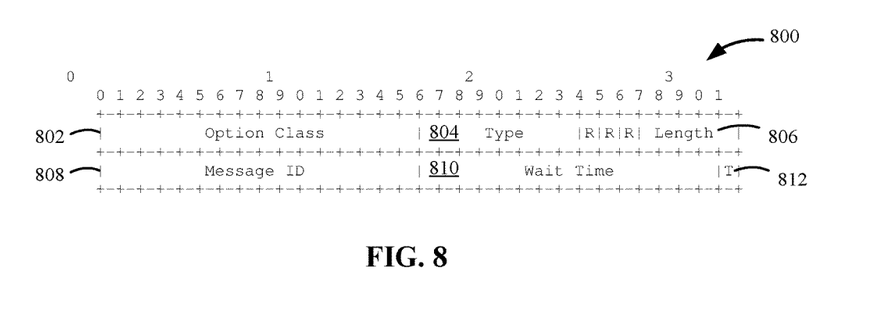
FIG. 8 depicts an example of an encapsulation header format according to some embodiments.

FIG. 8 depicts an example of an encapsulation header format 800 according to some embodiments. It is noted that different encapsulation protocols may be used. For example, tunneling protocols may include generic network virtualization encapsulation (GENEVE), virtual eXtension local area network (VXLAN), stateless transport tunneling (STT), etc. Although these tunneling protocols are discussed, other tunneling protocols may be used that allow the heartbeat request message and heartbeat response message to be inserted into an encapsulation header. An encapsulation header 800 may be used to carry either the heartbeat request message or the heartbeat response message. In one example, the GENEVE protocol may allow encapsulation headers to be extended. Accordingly, encapsulation header 800 may be added to an encapsulation header in the GENEVE protocol. However, the GENEVE protocol does not need to be used. Rather, any protocol in which information for the heartbeat messages (e.g., around 8 bytes) can be inserted in the encapsulation header can be used.

At 802, the encapsulation header includes an option class that specifies a value that is allocated from the Internet Assigned Numbers Authority (IANA). At 804, a type can be provisioned as zero or could be extended for other usage. At 806, the length may be provisioned as one. At 808, the message ID is inserted into the encapsulation header. At 810, the wait time is inserted, if applicable, into the encapsulation header. As discussed above, the wait time is not inserted in a request message, but the wait time, if any, is inserted into a heartbeat response message. At 812, the value of the field T may indicate whether this is a heartbeat request message or a heartbeat response message. For example, the value of zero may be used if this is a heartbeat request message, the value of one may be used if this is a heartbeat response message, and no encapsulation header, the setting of another value, or setting a value in another field means no heartbeat message is included.

CONCLUSION

Accordingly, some embodiments provide tunnel state for active tunnels. The system only sends heartbeat request messages when active traffic occurs during a period on a tunnel. The system sends a heartbeat response message either using active traffic on the tunnel or creates an empty packet to send the response. The system aggregates statistics to determine tunnel state for active tunnels that are being used during periods.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
   detecting, at a hypervisor of a first host, a first packet being sent from a data compute node of the first host;
   determining whether to send a first heartbeat message in the first packet;
   when it is determined that the first heartbeat message should be sent in the first packet, performing at the hypervisor:
      encapsulating the first packet with a first encapsulation header to form a first encapsulated packet, wherein the first encapsulation header identifies a first address of a first tunnel endpoint in the first host and a second address of a second tunnel endpoint in a second host;
      inserting the first heartbeat message in the first encapsulation header that encapsulates the first packet;
      sending the first encapsulated packet through a tunnel via the first address of the first tunnel endpoint to the second address of the second tunnel endpoint;
      determining if a second encapsulated packet is received at the first tunnel endpoint in the first host from the second tunnel endpoint in the second host; and
      when the second encapsulated packet is received and includes a second heartbeat message, recording information for the tunnel based on the sending of the first heartbeat message and the receiving of the second heartbeat message; and
   when it is determined that the first heartbeat message should not be sent in the first packet, encapsulating, by the computing device, the first packet to form a third encapsulated packet without the first heartbeat message and sending the third encapsulated packet.

2. The method of claim 1, wherein the information is used to calculate a roundtrip time for the sending of the first heartbeat message and the receiving of the second heartbeat message.

3. The method of claim 2, wherein the roundtrip time is calculated based on a first time in which the first encapsulated packet was sent, a second time in which the second encapsulated packet was received, and any wait time between the first encapsulated packet being received at the second host and the second encapsulated message being sent by the second host.

4. The method of claim 1, wherein:
   the data compute node of the first host is a first data compute node, and
   the second packet is sent from a second data compute node on the second host via the second tunnel endpoint to the first tunnel endpoint.

5. The method of claim 1, wherein the second packet is created by the second host after a time period elapsed in which no data compute node of the second host sent a packet via the second tunnel endpoint to the first tunnel endpoint.

6. The method of claim 1, further comprising:
   analyzing the information against one or more thresholds to determine a tunnel state for the tunnel.

7. The method of claim 1, wherein:
   the first heartbeat message includes a message identifier and an indication that the first encapsulated packet includes the first heartbeat message, and
   the second heartbeat message includes the message identifier, an indication that the second encapsulated packet includes the first heartbeat message, and a wait time between when the first encapsulated packet was received at the second host and the second encapsulated message was sent by the second host.

8. A non-transitory computer-readable storage medium containing instructions, that when executed, control a first host to be configured for:
  detecting, at a hypervisor of a first host, a first packet being sent from a data compute node of the first host;
  determining whether to send a first heartbeat message in the first packet;
  when it is determined that the first heartbeat message should be sent in the first packet, performing at the hypervisor:
    encapsulating the first packet with a first encapsulation header to form a first encapsulated packet, wherein the first encapsulation header identifies a first address of a first tunnel endpoint in the first host and a second address of a second tunnel endpoint in a second host;
    inserting the first heartbeat message in the first encapsulation header that encapsulates the first packet;
    sending the first encapsulated packet through a tunnel via the first address of the first tunnel endpoint to the second address of the second tunnel endpoint;
    determining if a second encapsulated packet is received at the first tunnel endpoint in the first host from the second tunnel endpoint in the second host; and
    when the second encapsulated packet is received and includes a second heartbeat message, recording information for the tunnel based on the sending of the first heartbeat message and the receiving of the second heartbeat message; and
  when it is determined that the first heartbeat message should not be sent in the first packet, encapsulating, by the computing device, the first packet to form a third encapsulated packet without the first heartbeat message and sending the third encapsulated packet.

9. The non-transitory computer-readable storage medium of claim 8, wherein the information is used to calculate a roundtrip time for the sending of the first heartbeat message and the receiving of the second heartbeat message.

10. The non-transitory computer-readable storage medium of claim 9, wherein the roundtrip time is calculated based on a first time in which the first encapsulated packet was sent, a second time in which the second encapsulated packet was received, and any wait time between the first encapsulated packet being received at the second host and the second encapsulated message being sent by the second host.

11. The non-transitory computer-readable storage medium of claim 8, wherein:
  the data compute node of the first host is a first data compute node, and
  the second packet is sent from a second data compute node on the second host via the second tunnel endpoint to the first tunnel endpoint.

12. The non-transitory computer-readable storage medium of claim 8, wherein the second packet is created by the second host after a time period elapsed in which no data compute node of the second host sent a packet via the second tunnel endpoint to the first tunnel endpoint.

13. The non-transitory computer-readable storage medium of claim 8, further configured for:
  analyzing the information against one or more thresholds to determine a tunnel state for the tunnel.

14. The non-transitory computer-readable storage medium of claim 8, wherein:
  the first heartbeat message includes a message identifier and an indication that the first encapsulated packet includes the first heartbeat message, and
  the second heartbeat message includes the message identifier, an indication that the second encapsulated packet includes the first heartbeat message, and a wait time between when the first encapsulated packet was received at the second host and the second encapsulated message was sent by the second host.

15. A method comprising:
  receiving a first encapsulated packet from a first data compute node of a first host at a hypervisor of a second host, the first encapsulated packet received via a second tunnel endpoint in the second host from a first tunnel endpoint in the first host;
  detecting, by the hypervisor, that a first heartbeat message is included in a first encapsulation header that encapsulates the first packet;
  detecting, by the hypervisor, that a second packet is sent from a second data compute node in the second host via the second tunnel endpoint to the first tunnel endpoint; and
  when the second packet is detected, performing by the hypervisor:
    encapsulating the second packet to form a second encapsulated packet, wherein the second encapsulation header identifies a first address of the first tunnel endpoint and a second address of the second tunnel endpoint;
    inserting a second heartbeat message in the second encapsulation header that; and
    sending the second encapsulated packet through the tunnel via the second address for the second tunnel endpoint to the first address for the first tunnel endpoint.

16. The method of claim 15, wherein when the second packet is not detected within a time period, the method further comprising:
  causing a third packet to be created;
  inserting the second heartbeat message in a third encapsulation header that encapsulates the third packet to form a third encapsulated packet; and
  sending the third encapsulated packet through the tunnel via the second address for the second tunnel endpoint to the first address for the first tunnel endpoint.

17. The method of claim 16, further comprising:
adding an entry for the first packet in a table to indicate the second heartbeat message needs to be sent.

18. The method of claim 16, further comprising:
starting a timer to measure the time period; and
detecting when the timer elapses before the second packet is detected as being sent from the second data compute node via the second address for the second tunnel endpoint to the first address for the first tunnel endpoint.

19. The method of claim 15, further comprising:
adding a wait time to the second encapsulation header indicating the wait time between the first encapsulated packet being received at the second host and the second encapsulated message being sent by the second host.

20. The method of claim 15, wherein:
the first heartbeat message includes a message identifier and an indication that the first encapsulated packet includes the first heartbeat message, and
the second heartbeat message includes the message identifier, an indication that the second encapsulated packet includes the first heartbeat message, and a wait time between when the first encapsulated packet is received at the second host and the second encapsulated message is sent by the second host.

* * * * *